United States Patent
Liu et al.

(10) Patent No.: US 10,261,918 B2
(45) Date of Patent: Apr. 16, 2019

(54) PROCESS RUNNING METHOD AND APPARATUS

(71) Applicant: HUAWEI TECHNOLOGIES CO., LTD., Shenzhen, Guangdong (CN)

(72) Inventors: Duo Liu, Chongqing (CN); Yakun Wang, Shenzhen (CN); Kan Zhong, Chongqing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/693,955

(22) Filed: Sep. 1, 2017

(65) Prior Publication Data
US 2017/0364449 A1    Dec. 21, 2017

Related U.S. Application Data

(63) Continuation of application No. PCT/CN2015/099051, filed on Dec. 25, 2015.

(30) Foreign Application Priority Data

Mar. 4, 2015  (CN) .......................... 2015 1 0097009

(51) Int. Cl.
*G06F 12/12*     (2016.01)
*G06F 12/02*     (2006.01)
(Continued)

(52) U.S. Cl.
CPC .............. *G06F 12/122* (2013.01); *G06F 9/00* (2013.01); *G06F 9/461* (2013.01); *G06F 9/4843* (2013.01);
(Continued)

(58) Field of Classification Search
CPC ....... G06F 2212/7201; G06F 2212/152; G06F 9/5016; G06F 12/122; G06F 9/00;
(Continued)

(56) References Cited

U.S. PATENT DOCUMENTS

2010/0064111 A1   3/2010  Kunimatsu et al.
2011/0066790 A1   3/2011  Mogul et al.
(Continued)

FOREIGN PATENT DOCUMENTS

CN     101673245 A      3/2010
CN     102226894        10/2011
(Continued)

OTHER PUBLICATIONS

International Search Report, dated Apr. 1, 2016, in International Application No. PCT/CN2015/099051 (5 pp.)
(Continued)

*Primary Examiner* — Hua J Song
(74) *Attorney, Agent, or Firm* — Staas & Halsey LLP

(57) ABSTRACT

A process running method and apparatus is disclosed. The method is: selecting a code page from a candidate process, storing only a code page of the candidate process into a swap partition, and releasing memory space occupied by the code page; updating a physical address that is of the code page and that is stored into a page entry; and when it is determined that the candidate process to which the code page belongs needs to be run, if the code page needs to be executed, directly executing the code page in the swap partition.

12 Claims, 9 Drawing Sheets

(51) Int. Cl.
- G06F 12/122 (2016.01)
- G06F 9/00 (2006.01)
- G06F 9/46 (2006.01)
- G06F 9/48 (2006.01)
- G06F 9/50 (2006.01)
- G06F 12/1009 (2016.01)

(52) U.S. Cl.
CPC .......... G06F 9/5016 (2013.01); G06F 9/5077 (2013.01); G06F 12/0246 (2013.01); G06F 12/1009 (2013.01); *G06F 2212/152* (2013.01); *G06F 2212/171* (2013.01); *G06F 2212/657* (2013.01); *G06F 2212/7201* (2013.01)

(58) Field of Classification Search
CPC ...... G06F 9/461; G06F 9/4843; G06F 9/5077; G06F 12/0246; G06F 12/1009; G06F 2212/171; G06F 2212/657
USPC ....................................................... 711/103
See application file for complete search history.

(56) References Cited

U.S. PATENT DOCUMENTS

| | | | |
|---|---|---|---|
| 2012/0151127 A1* | 6/2012 | Lim | G06F 12/0246 711/103 |
| 2015/0220135 A1 | 8/2015 | Huang et al. | |

FOREIGN PATENT DOCUMENTS

| | | |
|---|---|---|
| CN | 103713882 A | 4/2014 |
| CN | 104182350 | 12/2014 |
| CN | 104281528 | 1/2015 |
| EP | 2930611 A1 | 10/2015 |
| WO | WO2014059613 | 4/2014 |

OTHER PUBLICATIONS

Written Opinion of the International Searching Authority, dated Apr. 1, 2016, in International Application No. PCT/CN2015/099051 (8 pp.)

Benavides et al., "The Enabling of an Execute-In-Place Architecture to Reduce the Embedded System Memory Footprint and Boot Time," Journal of Computers, vol. 3, No. 1, Jan. 2008, XP55399069A, pp. 79-89.

Corbet, Jonathan, "LSFMM: Improving the out-of-memory killer," LWN.net, LSFMM Summit 2013, Apr. 23, 2013, XP55447595, 2 pgs.

Extended European Search Report dated Feb. 27, 2018, in corresponding European Patent Application No. 15883835.9, 12 pgs.

International Search report dated Apr. 1, 2016 in corresponding International Patent Application No. PCT/CN2015/099051.

Office Action, dated Sep. 25, 2018, in Chinese Application No. 201510097009.3 (8 pp.).

* cited by examiner

PROCESS RUNNING METHOD AND APPARATUS

CROSS-REFERENCE TO RELATED APPLICATIONS

This application is a continuation of International Application No. PCT/CN2015/099051, filed on Dec. 25, 2015, which claims priority to Chinese Patent Application No. 201510097009.3, filed on Mar. 4, 2015. The disclosures of the aforementioned applications are hereby incorporated by reference in their entireties.

TECHNICAL FIELD

The present application relates to the field of computer application technologies, and in particular, to a process running method and apparatus.

BACKGROUND

With development of microprocessors and electronic mobile terminal operating systems, electronic mobile terminals (such as a smartphone and a tablet computer) are widely used, and application functions designed for the electronic mobile terminals are increasingly powerful. Specific memory resources need to be occupied when any application program in an electronic mobile terminal runs. Therefore, though an application with abundant functions improves user experience of the electronic mobile terminal, more memory resources need to be occupied. In all existing electronic mobile terminals, a dynamic random access memory (DRAM) is used as a memory. A DRAM capacity increase can meet a requirement of the application program for memory resources to some extent. However, the DRAM capacity increase may cause a cost increase of the electronic mobile terminal. In addition, power consumption of the DRAM is high, and the power consumption may account for up to 30% of entire power consumption of an operating system. When the DRAM serves as a memory of the electronic mobile terminal, power consumption of the electronic mobile terminal is high.

Based on the foregoing problem, currently, a manner in which a swap partition is set in the operating system may further be to relieve memory pressure. For example, an Android operating system is based on an operating system of a Linux kernel, and the Linux kernel provides a method for resolving a problem of memory resource insufficiency by using a swap partition. An existing Swap mechanism may use a new byte-addressable nonvolatile memory (NVM) as a Swap partition. The Swap partition is generally divided into page slots for management. A size of each page slot equals a size of a memory page, and this is convenient for storing a memory page that is replaced from a memory. When memory resources in the electronic mobile terminal are insufficient, the operating system may store some less frequently used memory pages into the swap partition. In this way, the less frequently used memory pages no longer occupy the memory resources, thereby reducing memory occupation.

Because an NVM can be erased and written for a limited quantity of times, technologies such as consumption balance need to be used to distribute write operations to each NVM page slot as evenly as possible, so as to maximize a lifetime of the NVM. In an existing consumption balance technology, two data structures are maintained in an operating system: a linked list storing a free page slot and a min heap storing all page slots and sorting them by their ages. When a memory of a mobile terminal is insufficient, and an inactive memory page needs to be stored into an NVM swap partition, an age of a page slot of a linked list head needs to be compared with an age of a page slot of a min heap top, so as to store the inactive page of the memory into a page slot with a smaller age. However, when the page slot of the min heap top is used and has a relatively small age, data of the page slot of the min heap top further needs to be copied to the page slot of the linked list head, and then the page slot of the min heap top can be used. This method always ensures that an NVM page slot with a smaller age is used to store a memory page, thereby achieving consumption balance.

By using the foregoing technical solution, extra storage space needs to be created in an electronic mobile terminal to store an age of each NVM page slot. This causes system resource waste and system performance deterioration. In addition, an age change of any NVM page slot causes re-sorting of all NVM page slots in a min heap, and further increases system overheads. Moreover, when the foregoing less frequently used memory page needs to be re-executed, an operating system replaces the less frequently used memory page into a memory again. Consequently, data is frequently exchanged and is written for multiple times. This further causes problems that process running time is affected and a lifetime of a swap partition is affected.

It may be seen that, currently, the following problems exist during process running: a process running speed is low, a lifetime of a swap partition is short, system resources are wasted, and system performance is poor.

SUMMARY

Embodiments of the present application provide a process running method and apparatus to resolve the following problems existing during process running: a process running speed is low, a lifetime of a swap partition is short, system resources are wasted, and system performance is poor.

Specific technical solutions provided in the embodiments of the present application are as follows:

According to a first aspect, a process running method is provided, including: scanning processes in a memory, and selecting a candidate process from all the processes; obtaining a code page from the selected candidate process, where the code page is used to store binary code or a shared library file of the process; writing the code page into a swap partition, and releasing storage space, in the memory, occupied by the code page; obtaining a physical address that is of the code page and that is stored in a page entry, and updating the physical address of the code page into a physical address for storing the code page in the swap partition, where the page entry is used to store a correspondence between a virtual address of the code page and the physical address of the code page; and executing, when the candidate process to which the code page belongs is running, the code page in the swap partition according to an updated correspondence that is stored in the page entry and that is between the virtual address and the physical address of the code page.

With reference to the first aspect, in a first possible implementation manner, before the scanning processes in a memory, the method further includes: determining that a capacity value of available storage space included in the memory is less than a preset threshold.

With reference to the first aspect or the first possible implementation manner of the first aspect, in a second possible implementation manner, a score level of each process is obtained, where a score level of any process is determined according to a priority of the any process and a size of memory space occupied by the any process; a lower priority of the any process and larger occupied memory space indicates a higher score level of the any process; and a higher priority of the any process and smaller occupied memory space indicates a lower score level of the any process; and a process is sequentially selected from all the processes in descending order of score levels, until available storage space included in the memory is greater than or equal to the preset threshold, and each selected process is determined as a candidate process.

With reference to the first aspect, the first possible implementation manner of the first aspect, or the second possible implementation manner of the second aspect, in a third possible implementation manner, the following operations are executed for each candidate process: scanning process virtual address space corresponding to the candidate process, and obtaining all virtual address areas in the process virtual address space according to a process descriptor of the candidate process; traversing all the virtual address areas in the process virtual address space; for each traversed virtual address area, determining whether the virtual address area is an executable area according to a flag bit of the virtual address area; and when it is determined that a virtual address area is an executable area, determining a page included in the virtual address area as the code page.

With reference to any one of the first aspect or the first possible implementation manner of the first aspect to the third possible implementation manner of the first aspect, in a fourth possible implementation manner, the following operations are executed for each code page: applying for a page slot in the swap partition; storing the code page into the page slot obtained by means of application; and updating the physical address of the code page into a physical address of the page slot.

With reference to the fourth possible implementation manner of the first aspect, in a fifth possible implementation manner, the swap partition is a nonvolatile memory NVM swap partition, and the NVM swap partition directly connects to a memory controller of the memory; and the code page is stored, by using the memory controller, into the page slot obtained by means of application.

With reference to any one of the first aspect or the first possible implementation manner of the first aspect to the fifth possible implementation manner of the first aspect, in a sixth possible implementation manner, when the candidate process to which the code page belongs is running, if it is determined that the code page needs to be executed, the virtual address that is of the code page and that is stored in the updated page entry is obtained; a physical address that is in a correspondence with the virtual address is obtained from the page entry; the code page is obtained from the swap partition according to the physical address; and the code page is executed.

According to a second aspect, a process running apparatus is provided, including: a scan unit, configured to scan processes in a memory; a candidate process selection unit, configured to select a candidate process from all the processes according to a result of scanning the processes in the memory by the scan unit; a code page obtaining unit, configured to obtain a code page from the candidate process selected by the candidate process selection unit, where the code page is used to store binary code or a shared library file of the process; a write unit, configured to write the code page obtained by the code page obtaining unit into a swap partition; a storage space release unit, configured to release storage space, in the memory, occupied by the code page obtained by the code page obtaining unit; a physical address obtaining unit, configured to obtain a physical address that is of the code page and that is stored in a page entry; an update unit, configured to update the physical address that is of the code page and that is obtained by the physical address obtaining unit into a physical address for storing the code page in the swap partition, where the page entry is used to store a correspondence between a virtual address of the code page and the physical address of the code page; and an execution unit, configured to, when the candidate process to which the code page belongs is running, execute the code page in the swap partition according to a correspondence that is stored in the page entry, that is updated by the update unit, and that is between the virtual address and the physical address of the code page.

With reference to the second aspect, in a first possible implementation manner, a determining unit is further included, and is configured to, before the processes in the memory are scanned, determine that a capacity value of available storage space included in the memory is less than a preset threshold.

With reference to the second aspect or the first possible implementation manner of the second aspect, in a second possible implementation manner, the candidate process selection unit is specifically configured to obtain a score level of each process, where a score level of any process is determined according to a priority of the any process and a size of memory space occupied by the any process; a lower priority of the any process and larger occupied memory space indicates a higher score level of the any process; and a higher priority of the any process and smaller occupied memory space indicates a lower score level of the any process; and sequentially select a process from all the processes in descending order of score levels, until available storage space included in the memory is greater than or equal to the preset threshold, and determine each selected process as a candidate process.

With reference to the second aspect, the first possible implementation manner of the second aspect, or the second possible implementation manner of the second aspect, in a third possible implementation manner, the code page obtaining unit is specifically configured to: execute the following operations for each candidate process: scanning process virtual address space corresponding to the candidate process, and obtaining all virtual address areas in the process virtual address space according to a process descriptor of the candidate process; traversing all the virtual address areas in the process virtual address space; for each traversed virtual address area, determining whether the virtual address area is an executable area according to a flag bit of the virtual address area; and when it is determined that a virtual address area is an executable area, determining a page included in the virtual address area as the code page.

With reference to any one of the second aspect or the first possible implementation manner of the second aspect to the third possible implementation manner of the second aspect, in a fourth possible implementation manner, the write unit is specifically configured to: execute the following operations for each code page: applying for a page slot in the swap partition, and storing the code page into the page slot obtained by means of application; and the update unit is specifically configured to: update the physical address of the code page into a physical address of the page slot.

With reference to the fourth possible implementation manner of the second aspect, in a fifth possible implementation manner, the write unit is specifically configured to:

store, by using a memory controller of the memory, the code page into the page slot obtained by means of application, where the swap partition is a nonvolatile memory NVM swap partition, and the NVM swap partition directly connects to the memory controller.

With reference to any one of the second aspect or the first possible implementation manner of the second aspect to the fifth possible implementation manner of the second aspect, in a sixth possible implementation manner, the execution unit is specifically configured to: when the candidate process to which the code page belongs is running, if it is determine that the code page needs to be executed, obtain the virtual address that is of the code page and that is stored into the updated page entry; determine, from the page entry, a physical address that is in a correspondence with the obtained virtual address; obtain the code page from the swap partition according to the physical address; and execute the code page.

In the embodiments of the present application, a code page is selected from a candidate process, only the code page in the candidate process is stored into a swap partition, and memory space occupied by the code page is released; a physical address that is of the code page and that is stored into a page entry is updated; and when it is determined that the candidate process to which the code page belongs needs to be run, if the code page needs to be executed, the code page is directly executed in the swap partition. By using the technical solutions in the present application, only a code page having a read-only characteristic is stored into a swap partition. When the code page needs to be executed, the code page is directly executed in the swap partition, with no need to replace the code page into a memory for execution. This effectively avoids frequent data exchanges while increasing a process running speed, thereby reducing a quantity of write operations caused by the frequent data exchanges. In addition, an age of each page slot does not need to be stored locally. This saves system space, reduces system overheads, and improves system performance.

DESCRIPTION OF EMBODIMENTS

Embodiments of the present application provide a process running method and apparatus to resolve the following problems existing during process running: a process running speed is low, a lifetime of a swap partition is short, system resources are wasted, and system performance is poor. In embodiments of the present application, a code page is selected from a candidate process, only the code page in the candidate process is stored into a swap partition, and memory space occupied by the code page is released; a physical address that is of the code page and that is stored into a page entry is updated; and when it is determined that the candidate process to which the code page belongs needs to be run, if the code page needs to be executed, the code page is directly executed in the swap partition. By using the technical solutions in the present application, only a code page having a read-only characteristic is stored into a swap partition. When the code page needs to be executed, the code page is directly executed in the swap partition, without a need to replace the code page into a memory for execution. This effectively avoids frequent data exchanges while increasing a process running speed, thereby reducing a quantity of write operations caused by the frequent data exchanges. In addition, an age of each page slot does not need to be stored locally. This saves system space, reduces system overheads, and improves system performance.

The following further describes the embodiments of the present application in detail with reference to accompanying drawings in this specification.

Figure 1:
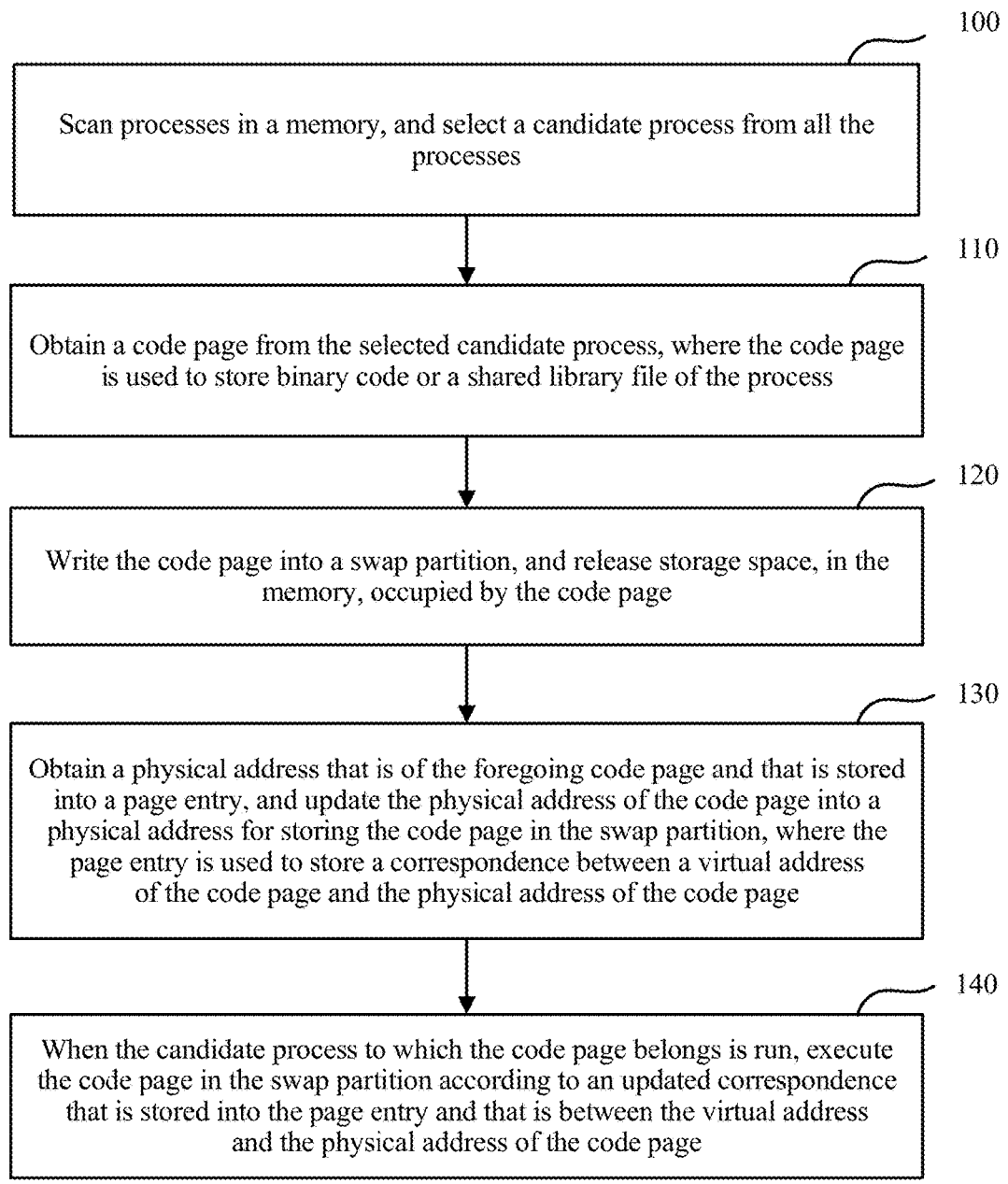
FIG. 1 is a flowchart of a process running method according to an embodiment of the present application.

Referring to FIG. 1, in an embodiment of the present application, a process running method of a terminal includes the following steps.

Step 100: Scan processes in a memory, and select a candidate process from all the processes.

In this embodiment of the present application, the terminal may run one application program at one moment, or may run multiple application programs at one moment. During running, each application program needs to apply for a corresponding memory resource, and uses the memory resource. A process is a minimum unit during running of an application program. Therefore, during application program running, when a memory of the terminal is insufficient to support application program running, that is, when storage space included in the memory of the terminal is less than a preset threshold, the terminal needs to scan processes corresponding to the currently running application program, select a candidate process from all the processes, and transfer the candidate process to a swap partition, to resolve the problem of insufficient memory resources. The foregoing terminal may be a mobile terminal (such as a mobile phone), or may be a personal computer (PC). Moreover, the terminal includes hardware devices such as a central processing unit (CPU), a memory (such as a DRAM), and a swap partition, and an operating system is installed in the terminal. The foregoing preset threshold may be dynamically adjusted according to a specific application scenario.

Optionally, the terminal selects the candidate process from all the processes according to a score level of each process. The selection is specifically: The terminal separately obtains a score level of each process. A score level of any process is determined according to a priority of the any process and a size of memory space occupied by the any process. For example, a corresponding weight value is separately assigned for a priority and a size of occupied memory space, and an overall score of any process is determined by using the following formula: "Priority× Weight value of priority+Size of occupied memory space× Weight value of memory space". Then, an overall score and score level comparison table locally stored in the terminal is searched for, to determine a score level corresponding to the overall score. The overall score and score level comparison table is used to store a correspondence between an overall score and a score level, and each score level may correspond to one overall score segment. The overall score and score level comparison table may be preset according to a specific application scenario. In addition, the foregoing score level is determined by a specific component in the operating system. For example, in an Android system, the score level may be determined by an Android Low Memory Killer (LMK). Finally, the candidate process is selected from all the processes in the memory according to the score level.

Optionally, a course in which the terminal selects the candidate process from all the processes in the memory according to the score level is specifically: A process is sequentially selected from all the processes in descending order of score levels until memory space applied for running all application programs is less than or equal to the foregoing preset threshold, and each selected process is determined as the candidate process. In this embodiment of the present application, a course of obtaining the candidate process is introduced by using the following example: A lower priority of any process and larger occupied memory space indicates a higher score level of the any process; and a higher priority of the any process and smaller occupied memory space indicates a lower score level of the any process. In addition, the following settings may also be performed in a mobile terminal: A higher priority of any process and smaller occupied memory space indicates a higher score level of the any process; and a lower priority of the any process and larger occupied memory space indicates a lower score level of the any process. In this case, the mobile terminal needs to sequentially select a process with a lowest score level from all the processes, until memory space applied for running all the application programs is less than or equal to the foregoing preset threshold, and then determine the foregoing selected process as the candidate process.

Figure 2:
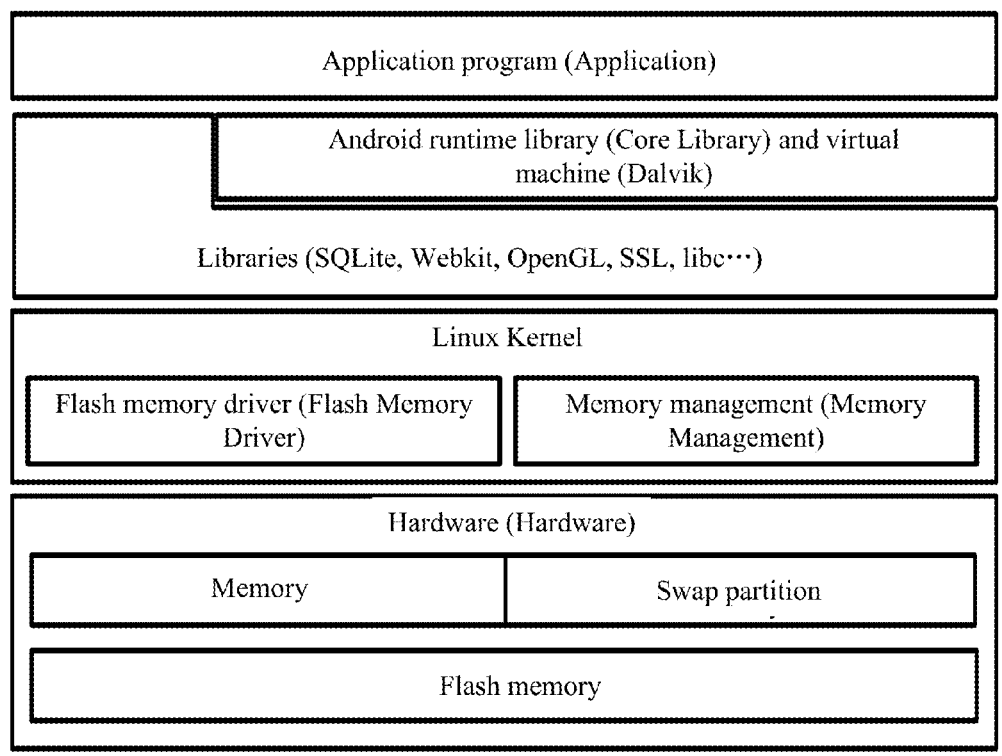
FIG. 2 is a schematic diagram of a terminal software hierarchy according to an embodiment of the present application.

In this embodiment of the present application, the operating system installed in the terminal may include multiple types, such as an Android operating system, an iOS operating system, and a Microsoft operating system. For example, referring to FIG. 2, when the operating system installed in the terminal is an Android operating system, a hierarchy of software installed in the terminal is as follows: The top layer is an application program; a Dalvik virtual machine and a runtime library of the Android system follow the application program; a Linux kernel follows Dalvik of the Android system, and the Linux kernel includes memory management, process management, a device driver program, and the like; the bottom layer is specific hardware, including a memory (such as a DRAM), a swap partition (such as an NVM and a flash memory Flash), and the like.

Step 110: Obtain a code page from the selected candidate process, where the code page is used to store binary code or a shared library file of the process.

In this embodiment of the present application, each process in the memory includes multiple pages (hereinafter referred to as memory page). Each memory page occupies specific storage space, and a size of memory space occupied by one process is a sum of storage space occupied by all memory pages included in the process. A page in a memory includes two types: code page and data page. A code page is used to store binary code or a shared library file of a process, and the code page has a read-only characteristic. A data page is used to store data and variables of an application program, and the data page does not have the read-only characteristic.

Optionally, the following operations are executed for each candidate process: scanning process virtual address space corresponding to the candidate process, where process virtual address space corresponding to each candidate process is memory space allocated by the terminal for each process; obtaining all virtual address areas in the process virtual address space according to a process descriptor of the candidate process, where each piece of virtual address space includes multiple virtual address areas, and the virtual address areas are mapped to physical storage space by using page entries, to store running data of the application program; traversing all the virtual address areas in the foregoing obtained process virtual address space; obtaining a flag bit of each traversed virtual address area; when a flag bit of a virtual address area is an executable area flag bit, determining that the virtual address area is an executable area; and determining a page included in the virtual address area as the code page.

Figure 3:
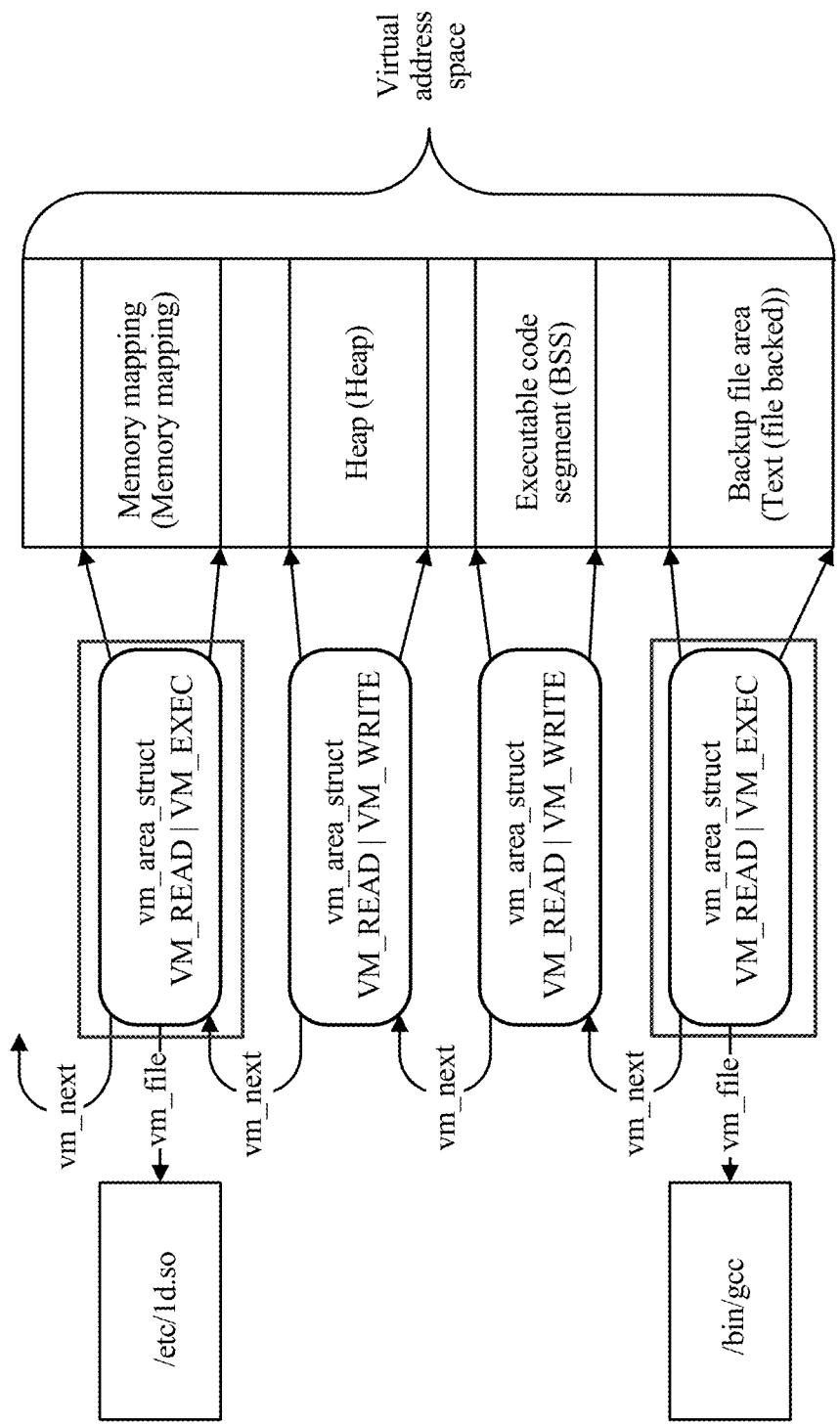
FIG. 3 is a schematic diagram of virtual address space according to an embodiment of the present application.

In the foregoing course, the process descriptor of the candidate process and the flag bit of the virtual address area are determined according to the operating system. That is, when different operating systems are installed in the terminal, the candidate process has different process descriptors, and the virtual address area has different flag bits. For example, referring to FIG. 3, FIG. 3 shows virtual address space of a process in an Android system. Multiple virtual address areas are included in the virtual address space of the process. Each virtual address area is represented by using vm_area_struct, and virtual address areas are connected by using vm_next. When no vm_next follows a virtual address area, it indicates that the virtual address area is an end location of virtual address space to which the virtual address area belongs. In an Android system, flag bits of a virtual address area include VM_READ and VM_EXEC. Parts shown in blocks (one part shown in a first block is a shared library file/etc/1d.so area, and the other part shown in a second block is binary code/bin/gcc area) in FIG. 3 are flag bits determined by both VM_READ and VM_EXEC. A page to which VM_READ and VM_EXEC point is a code page, that is, "Memory mapping" and "Text (file backed)" in FIG. 3.

In the foregoing technical solution, according to a code page characteristic, a process descriptor, and a flag bit, a code page is selected from all pages of a candidate process stored in a memory. In this way, code pages of each candidate process can be quickly and accurately obtained, and system processing efficiency can be improved.

Step 120: Write the code page into a swap partition, and release storage space, in the memory, occupied by the code page.

Figure 4A:
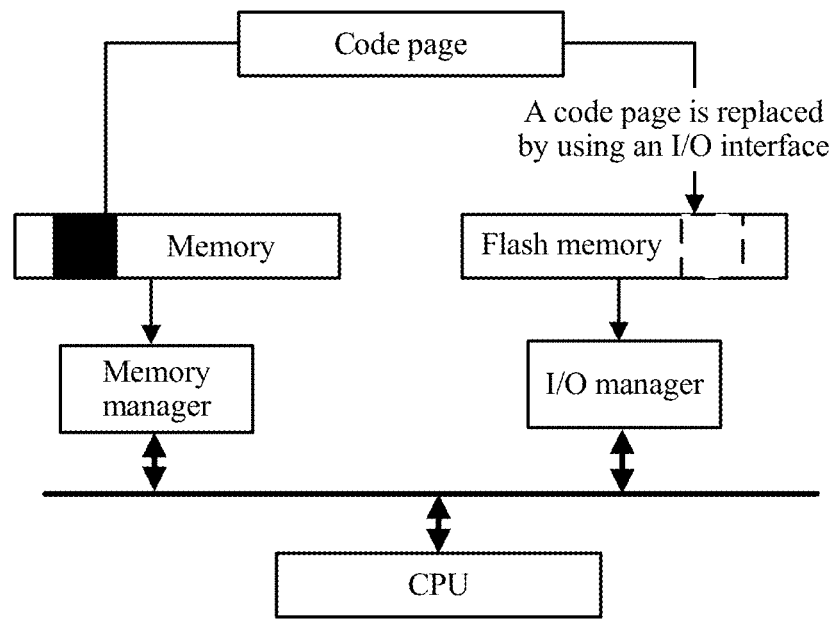
FIG. 4a and FIG. 4b are schematic diagrams of a memory and a swap partition according to an embodiment of the present application.
Figure 4B:
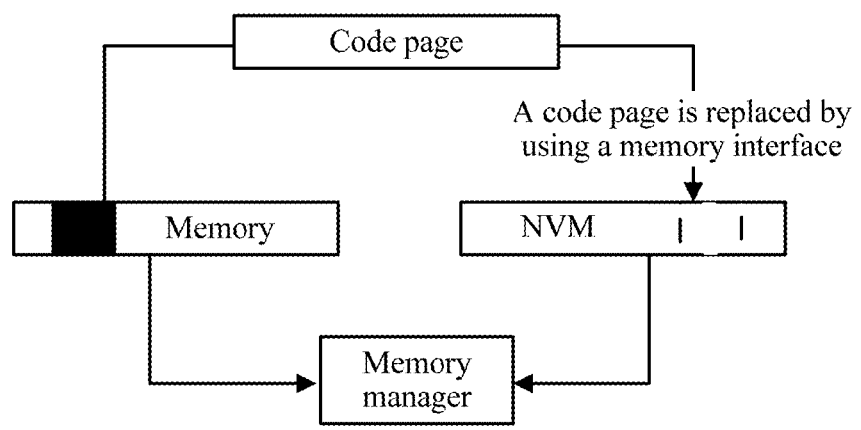

In this embodiment of the present application, the terminal writes the obtained code page into the swap partition. After all code pages are written into the swap partition, the terminal releases storage space, in the memory, occupied by the code pages, to reduce memory occupation. Referring to FIG. 4a, the swap partition may be implemented by using a flash memory. An I/O driver program is responsible for data transmission between the memory and the flash memory, that is, I/O scheduling is needed for the data transmission between the memory and the flash memory. Referring to FIG. 4b, the swap partition may also be implemented by using an NVM. Both the memory and the NVM connect to a memory controller, and the memory controller controls a data exchange between the memory and the NVM. In addition, an operating system installed in the terminal considers that the memory and the NVM are the same. The operating system may access, by using a virtual address, data stored in the memory and the swap partition. Data is exchanged between the swap partition and the memory by using a memory interface, and data in the NVM may be copied to the memory by using the memory interface, and vice versa. In addition, the memory and the NVM are uniformly coded. When the swap partition is implemented by using a flash memory, a problem of a long read-write delay exists because I/O scheduling is needed for the data transmission between the memory and the flash memory, and a speed of I/O scheduling is low. When the swap partition is implemented by using an NVM, data transmission between the memory and the NVM is directly scheduled by the memory controller; therefore, data is transmitted by using a memory bus, without requiring I/O scheduling. Compared with the scheme of implementing the swap partition by using a flash memory, a read-write delay is short when the swap partition is implemented by using an NVM.

Optionally, the terminal executes the following operations for each code page: A basic unit of the swap partition is a page slot, and a size of storage space occupied by each code page equals a size of storage space occupied by one page slot. Therefore, when determining to release memory space, the terminal applies for a page slot in the swap partition for a code page, and the terminal directly stores, by using the memory controller, the code page into the page slot obtained by means of application.

By using the foregoing technical solution, a terminal stores an obtained code page into a swap partition, and further releases storage space, in a memory, occupied by the replaced code page. This provides more memory resources for running other processes, thereby effectively resolving a problem of memory resource insufficiency.

Step 130: Obtain a physical address that is of the foregoing code page and that is stored into a page entry, and update the physical address of the code page into a physical address for storing the code page in the swap partition, where the page entry is used to store a correspondence between a virtual address of the code page and the physical address of the code page.

Figure 5:
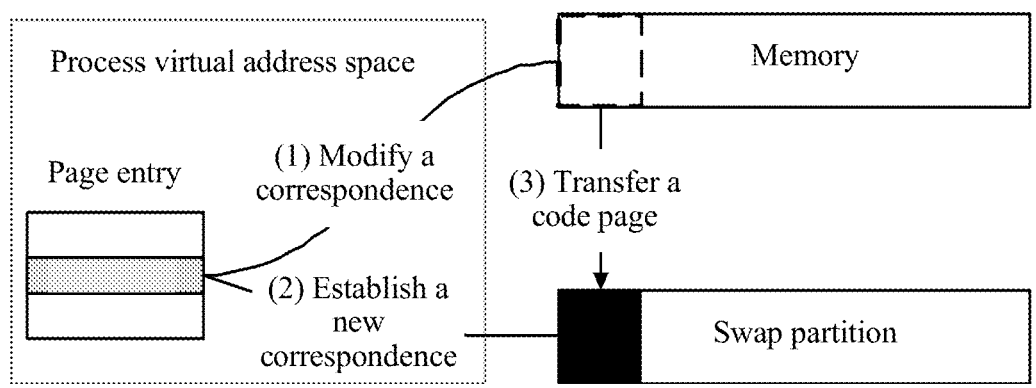
FIG. 5 is a schematic diagram of a course of a write operation in a swap partition according to an embodiment of the present application.

In this embodiment of the present application, a page entry is locally stored in the terminal, and the page entry stores the correspondence between the virtual address of the code page and the physical address of the code page. A virtual address of a code page is unchangeable. After storing the code page into the page slot obtained by means of application, the terminal updates the physical address that is of the code page and that is in the page entry into the physical address for storing the code page in the swap partition. Based on the foregoing course, the terminal stores the foregoing code page into a corresponding page slot in the swap partition. Therefore, the physical address of the code page is updated into the physical address for storing the code page in the swap partition. That is, the physical address of the code page is updated into the physical address of the foregoing page slot. Referring to FIG. 5, FIG. 5 is a schematic diagram of data exchanges among a page entry, a memory, and a swap partition when a code page is written into the swap partition in this embodiment of the present application.

By using the foregoing technical solution, after storing a code page into a page slot obtained by means of application, a terminal updates a physical address that is of the foregoing code page and that is in a page entry. This avoids a problem that a code page cannot be obtained according to an original physical address when data included in the foregoing code page is subsequently executed in a swap partition, thereby ensuring feasibility of code page execution.

Step 140: When the candidate process to which the code page belongs is running, execute the code page in the swap partition according to an updated correspondence that is stored in the page entry and that is between the virtual address and the physical address of the code page.

In this embodiment of the present application, when determining to run the candidate process to which the code page belongs, if determining to execute any code page that is in the swap partition, the terminal obtains a virtual address of the foregoing any code page from an updated page entry, determines, from the page entry, a physical address that is in a correspondence with the obtained virtual address, obtains the foregoing any code page from the swap partition according to the physical address, and executes data included in the any code page.

Figure 6:
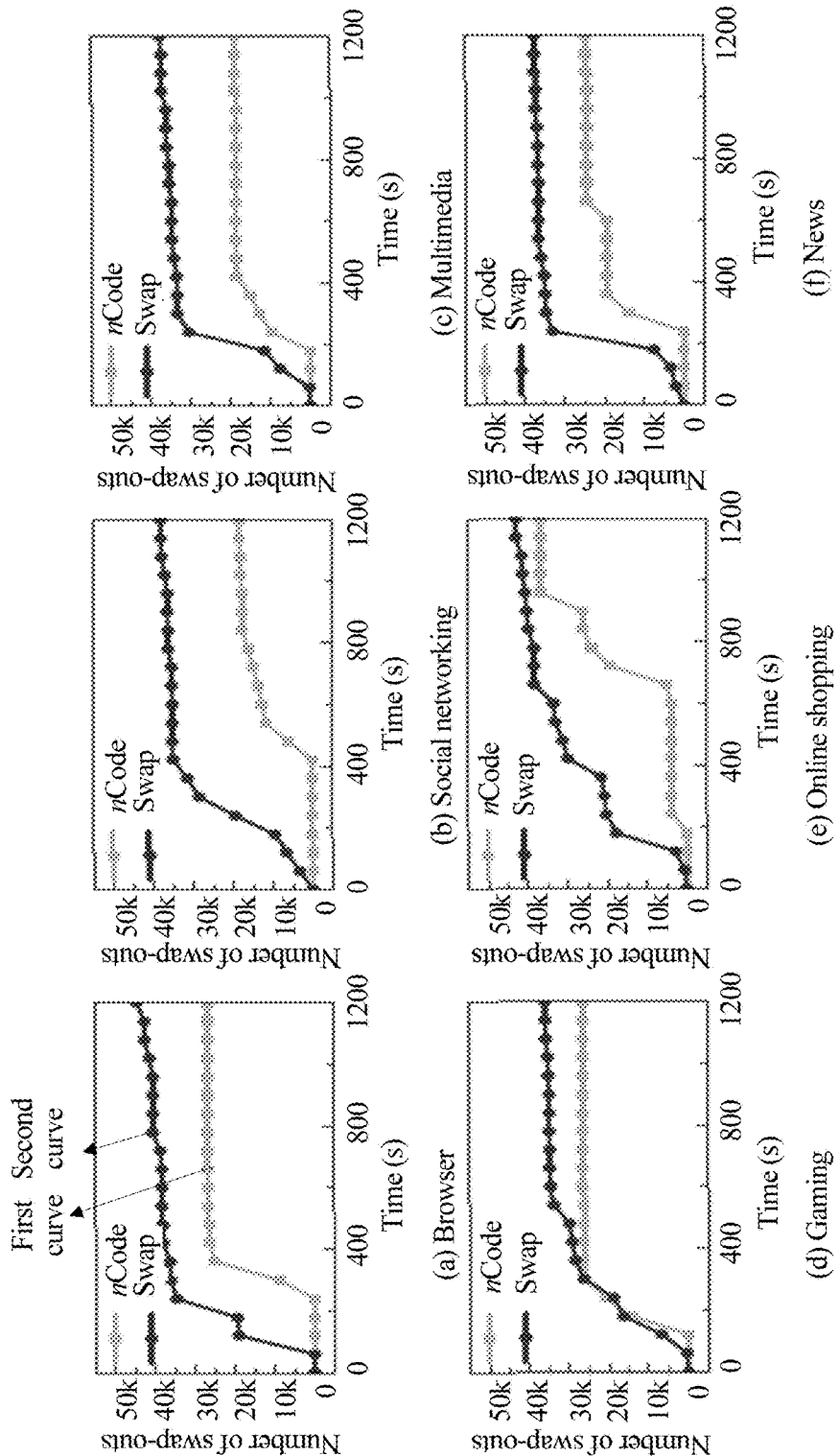
FIG. 6 is a Schematic Diagram 1 of a comparison result according to an embodiment of the present application.

Based on the foregoing technical solution, the technical solution of the present application is compared with a method in the prior art that a less frequently used memory page is selected and replaced into a swap partition. It is assumed that an application environment is a Google Nexus 5 mobile phone. In a course of comparison, different types of application programs are selected, and these application programs are classified into six types: Browser, Social networking, Multimedia, Gaming, Online Shopping, and News. Each type of application program runs for 20 minutes by separately using the technical solution provided in the present application and the prior art. Referring to FIG. 6, FIG. 6 is a curve of a write operation, of a swap partition, that changes with time. In the diagram, a horizontal coordinate represents time, and a vertical coordinate represents a total quantity of write operations of the swap partition. The first curve represents a result of running the application program by using the technical solution of the present application, and the second curve represents a result of running the application program by using the prior art. It may be learned from FIG. 6 that, comparing with write operations generated from running the application by using the prior art, write operations are reduced by 14% to 51% when the application program is run by using the technical solution provided in the present application. In addition, when a write operation is executed in the swap partition by using the technical solution of the present application, if the terminal does not run a new application program, a quantity of write operations in the swap partition does not increase after a period; however, write operations in the swap partition constantly increase when the application program is run by using the prior art.

It may be seen that, in a manner of executing a write operation in a swap partition in the prior art, after a code page is replaced into the swap partition, write operations in the swap partition constantly increase when the code page is needed. Comparatively, by using the technical solution of the present application, only a code page of a candidate process is replaced into a swap partition. When any code page in the swap partition needs to be executed, the any code page is directly executed in the swap partition, with no need to re-call the any code page into the memory. With constant replacement of code pages, available memory space is increasingly large, and finally, the available memory space tends to be stable. A code page does not need to be replaced from the memory to the swap partition, and a quantity of write operations of the swap partition tend to be stable, and does not increase after a specific period. In this way, the quantity of write operations of the swap partition is reduced, and a lifetime of the swap partition is effectively extended.

Figure 7:
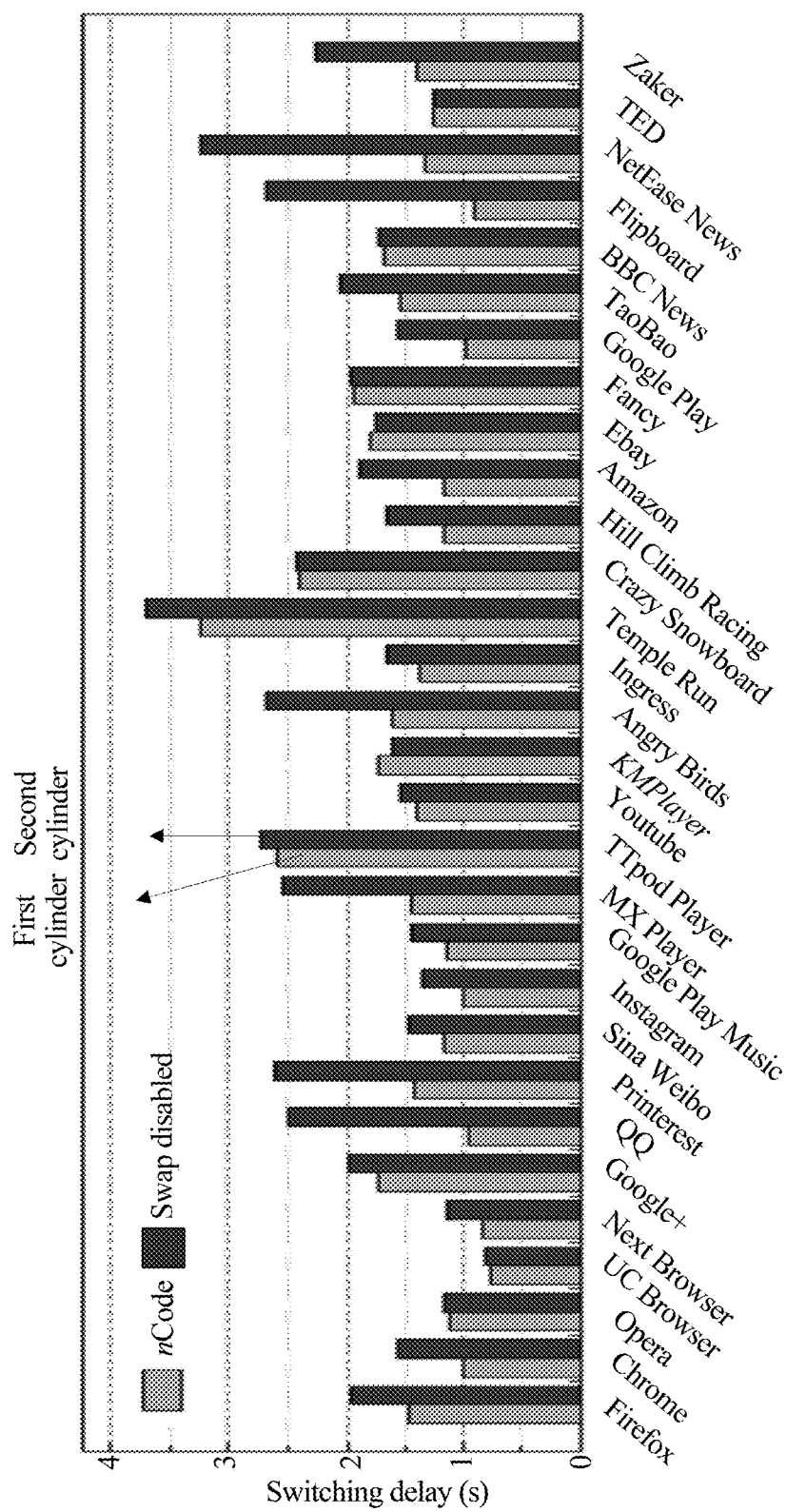
FIG. 7 is a Schematic Diagram 2 of a comparison result according to an embodiment of the present application.

Based on the foregoing technical solution, when the technical solution of the present application is used, a switch time of an application program in a scenario with a swap partition is compared with that in a scenario without a swap partition. In a course of this comparison, it is assumed that in the foregoing two scenarios, 30 application programs are run in a terminal and switches are constantly performed between the 30 application programs. For a comparison result, refer to FIG. 7. In FIG. 7, a horizontal coordinate represents an application program, a vertical coordinate represents an average switch time of the application programs, the first cylinder represents the application scenario with a swap partition, and the second cylinder represents the application scenario without a swap partition. It may be learned from FIG. 7 that, compared with the scenario without a swap partition, the switch time of the application programs is reduced by 19% to 41% in the scenario with a swap partition according to the technical solution of the present application.

It may be seen that in the prior art, when a swap partition does not exist, if memory space is insufficient, a mechanism used by a terminal forcibly stops an application program corresponding to a page. When the memory space becomes sufficient, the terminal needs to reload the foregoing application program, and this causes a relatively long execution time of the application program. By using the technical solution of the present application, when memory space is insufficient, a code page of a candidate process is stored into a swap partition. When any code page in the swap partition needs to be executed, only the any code page needs to be obtained according to a physical address of the any code page, with no need to re-call the any code page into a memory. Further, the any code page is executed directly, with no need to forcibly stop the application program, and this improves an execution speed of the application program.

Figure 8:
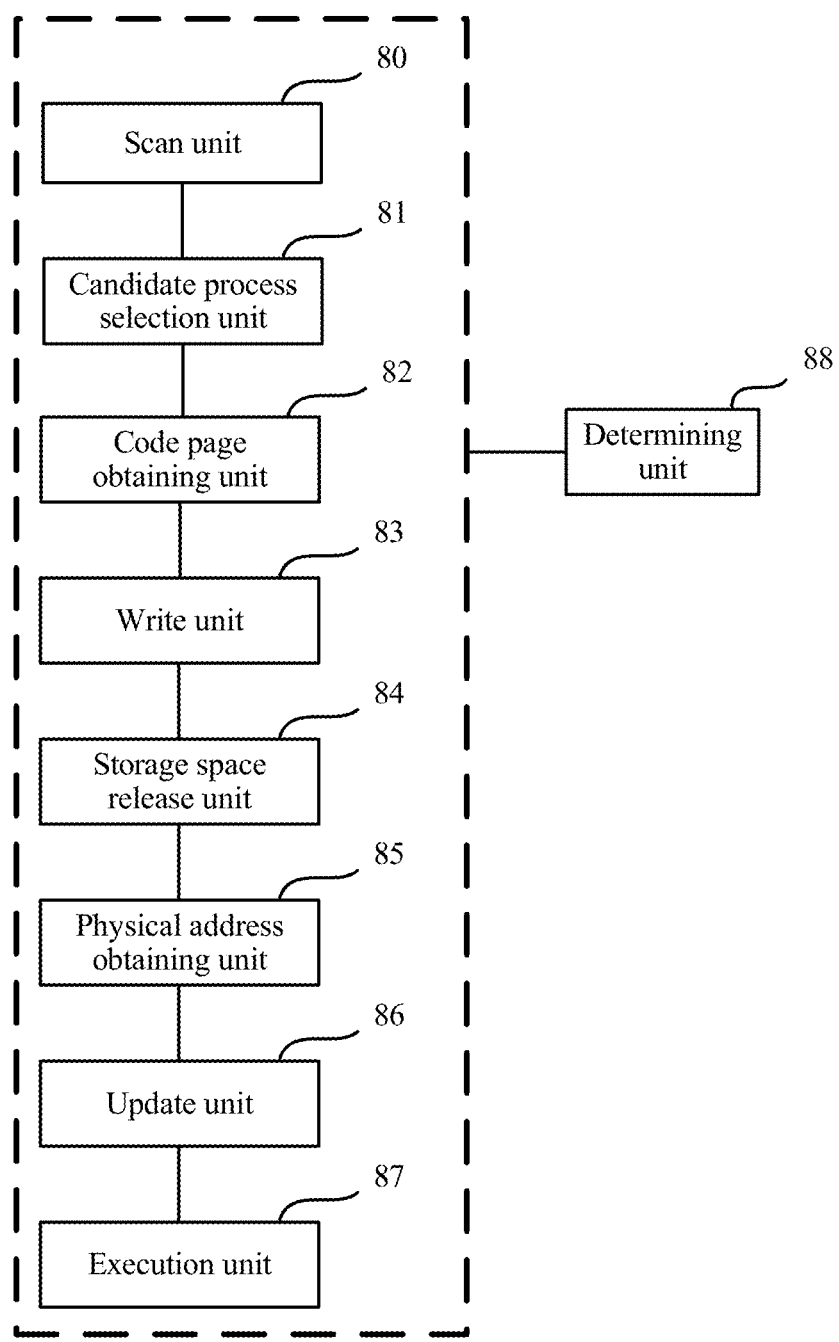
FIG. 8 is a schematic structural diagram of a process running apparatus according to an embodiment of the present application.

Based on the foregoing technical solution, referring to FIG. 8, an embodiment of the present application further provides a process running apparatus, including a scan unit 80, a candidate process selection unit 81, a code page obtaining unit 82, a write unit 83, a storage space release unit 84, a physical address obtaining unit 85, an update unit 86, and an execution unit 87.

The scan unit 80 is configured to scan processes in a memory.

The candidate process selection unit 81 is configured to select a candidate process from all the processes according to a result of scanning the processes in the memory by the scan unit 80.

The code page obtaining unit 82 is configured to obtain a code page from the candidate process selected by the candidate process selection unit 81, where the code page is used to store binary code or a shared library file of the process.

The write unit 83 is configured to write the code page obtained by the code page obtaining unit 82 into a swap partition.

The storage space release unit 84 is configured to release storage space, in the memory, occupied by the code page obtained by the code page obtaining unit 82.

The physical address obtaining unit 85 is configured to obtain a physical address that is of the code page and that is stored in a page entry.

The update unit 86 is configured to update the physical address that is of the code page and that is obtained by the physical address obtaining unit 85 into a physical address for storing the code page in the swap partition, where the page entry is used to store a correspondence between a virtual address of the code page and the physical address of the code page.

The execution unit 87 is configured to, when the candidate process to which the code page belongs is running, execute the code page in the swap partition according to a correspondence that is stored in the page entry, that is updated by the update unit 86, and that is between the virtual address and the physical address of the code page.

Further, the foregoing apparatus further includes a determining unit 88, configured to, before the processes in the memory are scanned, determine that a capacity value of available storage space included in the memory is less than a preset threshold.

Optionally, the candidate process selection unit 81 is specifically configured to: obtain a score level of each process, where a score level of any process is determined according to a priority of the any process and a size of memory space occupied by the any process; a lower priority of the any process and larger occupied memory space indicates a higher score level of the any process; and a higher priority of the any process and smaller occupied memory space indicates a lower score level of the any process; and sequentially select a process from all the processes in descending order of score levels, until available storage space included in the memory is greater than or equal to the preset threshold, and determine each selected process as a candidate process.

Optionally, the code page obtaining unit 82 is specifically configured to: execute the following operations for each candidate process: scanning process virtual address space corresponding to the candidate process, and obtaining all virtual address areas in the process virtual address space according to a process descriptor of the candidate process; traversing all the virtual address areas in the process virtual address space; for each traversed virtual address area, determining whether the virtual address area is an executable area according to a flag bit of the virtual address area; and when it is determined that a virtual address area is an executable area, determining a page included in the virtual address area as the code page.

Optionally, the write unit 83 is specifically configured to: execute the following operations for each code page: applying for a page slot in the swap partition, and storing the code page into the page slot obtained by means of application; and the update unit 86 is specifically configured to: update the physical address of the code page into a physical address of the page slot.

Optionally, the write unit 83 is specifically configured to store, by using a memory controller of the memory, the code page into the page slot obtained by means of application, where the swap partition is a nonvolatile memory NVM swap partition, and the NVM swap partition directly connects to the memory.

Optionally, the execution unit 87 is specifically configured to: when the candidate process to which the code page belongs is running, if it is determined that the code page needs to be executed, obtain the virtual address that is of the code page and that is stored into the updated page entry; determine, from the page entry, a physical address that is in a correspondence with the obtained virtual address; obtain the code page from the swap partition according to the physical address; and execute the code page.

Figure 9:
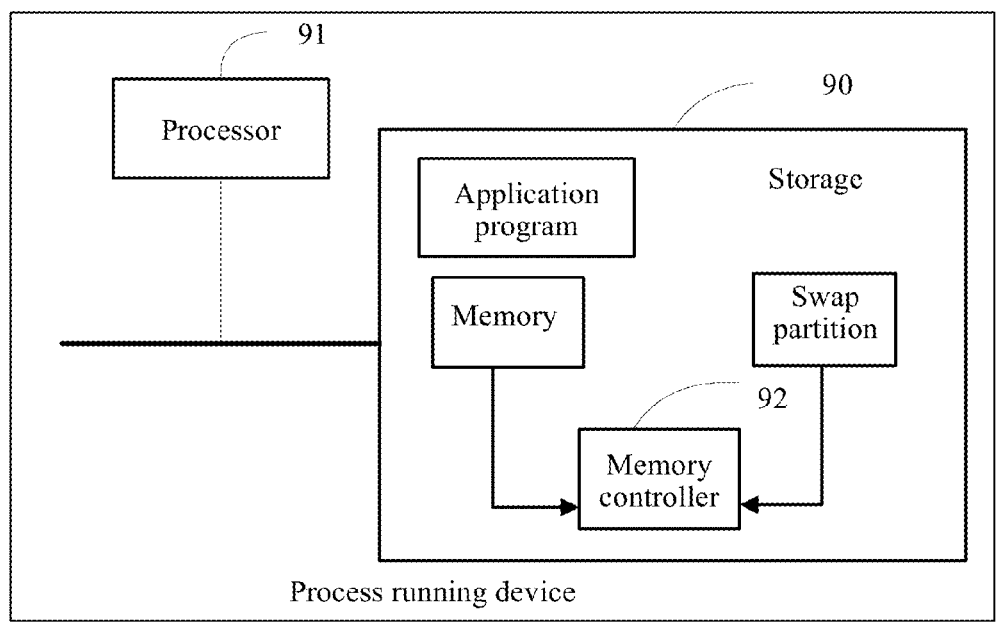
FIG. 9 is a schematic structural diagram of a process running device according to an embodiment of the present application.

Based on the foregoing technical solution, referring to FIG. 9, an embodiment of the present application further provides a process running device, including a storage 90 and a processor 91.

The storage 90 is configured to store an application program and a page entry, and includes a swap partition and a memory.

The processor 91 is configured to execute the application program in the storage 90 to execute the following operations:

scanning processes in a memory; selecting a candidate process from all the processes according to a result of scanning the processes in the memory by the processor 91; obtaining a code page from the candidate process selected by the processor 91, where the code page is used to store binary code or a shared library file of the process; writing the code page obtained by the processor 91 into a swap partition; releasing storage space, in the memory, occupied by the code page obtained by the processor 91; obtaining a physical address that is of the code page and that is stored in a page entry; updating the physical address that is of the code page and that is obtained by the processor 91 into a physical address for storing the code page in the swap partition, where the page entry is used to store a correspondence between a virtual address of the code page and the physical address of the code page; when the candidate process to which the code page belongs is running, executing the code page in the swap partition according to a correspondence that is stored in the page entry, that is updated by the processor 91, and that is between the virtual address and the physical address of the code page.

Further, the processor 91 is further configured to before the processes in the memory are scanned, determine that a capacity value of available storage space included in the memory is less than a preset threshold.

Optionally, the processor 91 is specifically configured to obtain a score level of each process, where a score level of any process is determined according to a priority of the any process and a size of memory space occupied by the any process; a lower priority of the any process and larger occupied memory space indicates a higher score level of the any process; and a higher priority of the any process and smaller occupied memory space indicates a lower score level of the any process; and sequentially select a process from all the processes in descending order of score levels, until available storage space included in the memory is greater than or equal to the preset threshold, and determine each selected process as a candidate process.

Optionally, the processor 91 is specifically configured to execute the following operations for each candidate process: scanning process virtual address space corresponding to the candidate process, and obtaining all virtual address areas in the process virtual address space according to a process descriptor of the candidate process; traversing all the virtual address areas in the process virtual address space; for each traversed virtual address area, determining whether the virtual address area is an executable area according to a flag bit of the virtual address area; and when it is determined that a virtual address area is an executable area, determining a page included in the virtual address area as the code page.

Optionally, the processor 91 is specifically configured to execute the following operations for each code page: applying for a page slot in the swap partition; storing the code page into the page slot obtained by means of application; and updating the physical address of the code page into a physical address of the page slot.

Further, the process running device further includes a memory controller 92, configured to connect the memory and the swap partition. Optionally, the processor 91 is specifically configured to store, by using the memory controller 92, the code page into the page slot obtained by means of application. The swap partition is an NVM swap partition.

Optionally, the processor 91 is specifically configured to: when the candidate process to which the code page belongs is running, if it is determine that the code page needs to be executed, obtain the virtual address that is of the code page and that is stored in the updated page entry; determine, from the page entry, a physical address that is in a correspondence with the obtained virtual address; obtain the code page from the swap partition according to the physical address; and execute the code page.

In conclusion, in this embodiment of the present application, processes in a memory are scanned, and a candidate process are selected from all the processes; a code page is obtained from the selected candidate process, where the code page is used to store binary code or a shared library file of the process; the code page is written into a swap partition, and storage space, in the memory, occupied by the code page is released; a physical address that is of the foregoing code page and that is stored in a page entry is obtained, and the physical address of the code page is updated into a physical address for storing the code page into the swap partition, where the page entry is used to store a correspondence between a virtual address of the code page and the physical address of the code page; and when the candidate process to which the code page belongs is running, the code page is executed in the swap partition according to an updated correspondence that is stored in the page entry and that is between the virtual address and the physical address of the code page. By using the technical solutions in the present application, only a code page having a read-only characteristic is stored into a swap partition. When the code page needs to be executed, the code page is directly executed in the swap partition, with no need to replace the code page into a memory for execution. This effectively avoids frequent data exchanges while increasing a process running speed, thereby reducing a quantity of write operations caused by the frequent data exchanges. In addition, an age of each page slot does not need to be stored locally. This saves system space, reduces system overheads, and improves system performance.

Persons skilled in the art should understand that the embodiments of the present application may be provided as a method, a system, or a computer program product. Therefore, the present application may use a form of hardware only embodiments, software only embodiments, or embodiments with a combination of software and hardware. Moreover, the present application may use a form of a computer program product that is implemented on one or more computer-usable storage media (including but not limited to a disk memory, a CD-ROM, an optical memory, and the like) that include computer-usable program code.

The present application is described with reference to the flowcharts and/or block diagrams of the method, the device (system), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present application have been described, persons skilled in the art can make changes and modifications to these embodiments once they learn the basic inventive concept. Therefore, the following claims are intended to be construed as to cover the preferred embodiments and all changes and modifications falling within the scope of the present application.

Obviously, persons skilled in the art can make various modifications and variations to the embodiments of the present application without departing from the spirit and scope of the embodiments of the present application. The present application is intended to cover these modifications and variations provided that they fall within the scope of protection defined by the following claims and their equivalent technologies.

What is claimed is:

1. A method of process running, comprising:
scanning processes in a memory, and selecting a candidate process from the processes;
obtaining a code page from the selected candidate process, wherein the code page is used to store binary code or a shared library file of the process;
writing the code page into a swap partition, and releasing storage space, in the memory, occupied by the code page;
obtaining a physical address that is of the code page and that is stored in a page entry, and updating the physical address of the code page into a physical address for storing the code page in the swap partition, wherein the page entry is used to store a correspondence between a virtual address of the code page and the physical address of the code page; and
executing, when the candidate process to which the code page belongs is running, the code page in the swap partition according to an updated correspondence that is stored in the page entry and that is between the virtual address and the physical address of the code page, wherein the selecting a candidate process from the processes comprises:
obtaining a score level of each process, wherein a score level of any process is determined according to a priority of the any process and a size of memory space occupied by the any process; a lower priority of the any process and larger occupied memory space indicates a higher score level of the any process; and a higher priority of the any process and smaller occupied memory space indicates a lower score level of the any process; and
sequentially selecting a process from the processes in descending order of score levels, until available storage space comprised in the memory is greater than or equal to the preset threshold, and determining each selected process as a candidate process.

2. The method according to claim 1, wherein before the scanning processes in a memory, the method further comprises:
determining that a capacity value of available storage space comprised in the memory is less than a preset threshold.

3. The method according to claim 1, wherein the writing the code page into a swap partition comprises:
executing the following operations for each code page:
applying for a page slot in the swap partition; and
storing the code page into the page slot obtained by means of application; and
the updating the physical address of the code page into a physical address for storing the code page in the swap partition comprises:
updating the physical address of the code page into a physical address of the page slot.

4. The method according to claim 3, wherein the swap partition is a nonvolatile memory (NVM) swap partition, and the NVM swap partition directly connects to a memory controller of the memory; and
the storing the code page into the page slot obtained by means of application comprises:
storing, by using the memory controller, the code page into the page slot obtained by means of application.

5. The method according to claim 1, wherein the executing, when the candidate process to which the code page belongs is running, the code page in the swap partition according to an updated correspondence that is stored in the page entry and that is between the virtual address and the physical address of the code page comprises:
when the candidate process to which the code page belongs is running, if it is determined that the code page needs to be executed, obtaining the virtual address that is of the code page and that is stored in the updated page entry;
obtaining, from the page entry, a physical address that is in a correspondence with the virtual address;
obtaining the code page from the swap partition according to the physical address; and
executing the code page.

6. A method of process running, comprising:
scanning processes in a memory, and selecting a candidate process from the processes;
obtaining a code page from the selected candidate process, wherein the code page is used to store binary code or a shared library file of the process;
writing the code page into a swap partition, and releasing storage space, in the memory, occupied by the code page;
obtaining a physical address that is of the code page and that is stored in a page entry, and updating the physical address of the code page into a physical address for storing the code page in the swap partition, wherein the page entry is used to store a correspondence between a virtual address of the code page and the physical address of the code page; and
executing, when the candidate process to which the code page belongs is running, the code page in the swap partition according to an updated correspondence that is stored in the page entry and that is between the virtual address and the physical address of the code page, wherein the obtaining a code page from the selected candidate process comprises:

executing the following operations for each candidate process:

scanning process virtual address space corresponding to the candidate process, and obtaining virtual address areas in the process virtual address space according to a process descriptor of the candidate process;

traversing the virtual address areas in the process virtual address space;

for each traversed virtual address area, determining whether the virtual address area is an executable area according to a flag bit of the virtual address area; and when it is determined that a virtual address area is an executable area, determining a page comprised in the virtual address area as the code page.

7. A process running apparatus, comprising:
a storage storing instructions; and
a processor coupled to the storage to execute the instructions to:
scan processes in a memory;
select a candidate process from the processes according to a result of scanning the processes in the memory;
obtain a code page from the candidate process selected, wherein the code page is used to store binary code or a shared library file of the process;
write the code page obtained into a swap partition;
release storage space, in the memory, occupied;
obtain a physical address that is of the code page and that is stored in a page entry;
update the physical address that is of the code page and that is obtained into a physical address for storing the code page in the swap partition, wherein the page entry is used to store a correspondence between a virtual address of the code page and the physical address of the code page;
when the candidate process to which the code page belongs is running, execute the code page in the swap partition according to a correspondence that is stored in the page entry, that is updated, and that is between the virtual address and the physical address of the code page; and
obtain a score level of each process, wherein a score level of any process is determined according to a priority of the any process and a size of memory space occupied by the any process; a lower priority of the any process and larger occupied memory space indicates a higher score level of the any process; and a higher priority of the any process and smaller occupied memory space indicates a lower score level of the any process; and sequentially select a process from the processes in descending order of score levels, until available storage space comprised in the memory is greater than or equal to the preset threshold, and determine each selected process as a candidate process.

8. The apparatus according to claim 7, the processor is further configured to:
before the processes in the memory are scanned, determine that a capacity value of available storage space comprised in the memory is less than a preset threshold.

9. The apparatus according to claim 7, wherein the processor is configured to:

execute the following operations for each code page: applying for a page slot in the swap partition, and storing the code page into the page slot obtained by means of application; and the processor is configured to:
update the physical address of the code page into a physical address of the page slot.

10. The apparatus according to claim 9, wherein the processor is configured to:
store, by using a memory controller of the memory, the code page into the page slot obtained by means of application, wherein the swap partition is a nonvolatile memory NVM swap partition, and the NVM swap partition directly connects to the memory controller.

11. The apparatus according to claim 7, wherein the processor is configured to:
when the candidate process to which the code page belongs is running, if it is determine that the code page needs to be executed, obtain the virtual address that is of the code page and that is stored into the updated page entry; determine, from the page entry, a physical address that is in a correspondence with the obtained virtual address; obtain the code page from the swap partition according to the physical address; and execute the code page.

12. A process running apparatus, comprising:
a storage storing instructions; and
a processor coupled to the storage to execute the instructions to:
scan processes in a memory;
select a candidate process from the processes according to a result of scanning the processes in the memory;
obtain a code page from the candidate process selected, wherein the code page is used to store binary code or a shared library file of the process;
write the code page obtained into a swap partition;
release storage space, in the memory, occupied;
obtain a physical address that is of the code page and that is stored in a page entry;
update the physical address that is of the code page and that is obtained into a physical address for storing the code page in the swap partition, wherein the page entry is used to store a correspondence between a virtual address of the code page and the physical address of the code page;
when the candidate process to which the code page belongs is running, execute the code page in the swap partition according to a correspondence that is stored in the page entry, that is updated, and that is between the virtual address and the physical address of the code page; and
execute the following operations for each candidate process: scanning process virtual address space corresponding to the candidate process, and obtaining virtual address areas in the process virtual address space according to a process descriptor of the candidate process; traversing the virtual address areas in the process virtual address space; for each traversed virtual address area, determining whether the virtual address area is an executable area according to a flag bit of the virtual address area; and when it is determined that a virtual address area is an executable area, determining a page comprised in the virtual address area as the code page.

* * * * *